(12) United States Patent
Lee et al.

(10) Patent No.: US 9,436,478 B2
(45) Date of Patent: Sep. 6, 2016

(54) METHOD FOR SETTING A VALUE OF OPTIONS OF OPERATIONAL ENVIRONMENT IN A USER DEVICE AND USER DEVICE ADAPTED THERETO

(71) Applicant: Samsung Electronics Co., Ltd., Gyeonggi-do (KR)

(72) Inventors: Kyungeun Lee, Gyeonggi-do (KR); Yongjoon Jeon, Gyeonggi-do (KR); Minchul Kim, Seoul (KR); Sungi Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 334 days.

(21) Appl. No.: 13/760,506

(22) Filed: Feb. 6, 2013

(65) Prior Publication Data
US 2013/0205131 A1 Aug. 8, 2013

(30) Foreign Application Priority Data
Feb. 8, 2012 (KR) .................. 10-2012-0012852

(51) Int. Cl.
| | |
|---|---|
| G06F 1/00 | (2006.01) |
| G06F 9/44 | (2006.01) |
| H04M 1/725 | (2006.01) |
| G06F 3/0346 | (2013.01) |
| G06F 3/0484 | (2013.01) |
| G06F 1/16 | (2006.01) |

(52) U.S. Cl.
CPC .............. *G06F 9/44* (2013.01); *G06F 1/1694* (2013.01); *G06F 3/0346* (2013.01); *G06F 3/04847* (2013.01); *H04M 1/72522* (2013.01); *G06F 2200/1637* (2013.01); *H04M 2250/12* (2013.01)

(58) Field of Classification Search
CPC .............. G06F 9/4411; G06F 1/1694; G06F 2200/1637; G06F 3/0346; G06F 3/04847; G06F 9/44; H04M 1/72522; H04M 2250/12
USPC ......... 345/77, 207, 667, 156, 691, 103, 690; 455/566; 713/340, 300
See application file for complete search history.

(56) References Cited

U.S. PATENT DOCUMENTS

| | | | | |
|---|---|---|---|---|
| 5,958,058 A * | 9/1999 | Barrus | ................ | G06F 1/3203 713/310 |
| 8,063,872 B2 * | 11/2011 | Forstall | ................ | G06F 1/3203 345/102 |
| 2005/0017994 A1 * | 1/2005 | Oh | ................ | G09G 3/3406 345/691 |
| 2006/0095800 A1 * | 5/2006 | Iwamoto | ................ | G06F 1/3203 713/300 |
| 2006/0123385 A1 * | 6/2006 | Medvedev | ................ | G09G 5/00 717/100 |
| 2007/0078552 A1 * | 4/2007 | Rosenberg | ............ | G06F 1/1626 700/94 |
| 2008/0133956 A1 * | 6/2008 | Fadell | ................ | G06F 1/3203 713/340 |

(Continued)

FOREIGN PATENT DOCUMENTS

| | | |
|---|---|---|
| EP | 2392995 | 12/2011 |
| KR | 1020100049854 | 5/2010 |
| WO | WO 2009/096644 | 8/2009 |

*Primary Examiner* — Aurel Prifti
(74) *Attorney, Agent, or Firm* — The Farrell Law Firm, P.C.

(57) ABSTRACT

A method and device for a user to intuitively and simply alter the setting of options of an application that is being executed in a user device by detecting interactions via a sensor module during execution of a specific mode, identifying an option corresponding to a detected interaction, altering an option setting value of the identified option according to a detected interaction, and displaying the altered option setting value and storing the option of the specific mode with the altered option setting value.

13 Claims, 8 Drawing Sheets

(56) References Cited

U.S. PATENT DOCUMENTS

| | | | |
|---|---|---|---|
| 2008/0218535 A1* | 9/2008 | Forstall | G06F 1/3203 345/690 |
| 2008/0291139 A1* | 11/2008 | Hsieh | 345/77 |
| 2009/0247144 A1 | 10/2009 | Jin et al. | |
| 2010/0039414 A1* | 2/2010 | Bell | 345/207 |
| 2010/0153313 A1 | 6/2010 | Baldwin et al. | |
| 2010/0253617 A1* | 10/2010 | Iio | G06F 3/03548 345/156 |
| 2010/0255885 A1* | 10/2010 | Lee | 455/566 |
| 2011/0059776 A1 | 3/2011 | Seo et al. | |
| 2011/0179366 A1 | 7/2011 | Chae | |
| 2011/0221871 A1* | 9/2011 | Sakaniwa | H04N 13/0029 348/51 |
| 2011/0316888 A1* | 12/2011 | Sachs et al. | 345/667 |
| 2012/0050152 A1* | 3/2012 | Salminen | G09G 3/3406 345/156 |
| 2012/0137217 A1* | 5/2012 | Amsterdam | G06F 1/3228 715/256 |
| 2012/0280900 A1* | 11/2012 | Wang et al. | 345/156 |

* cited by examiner

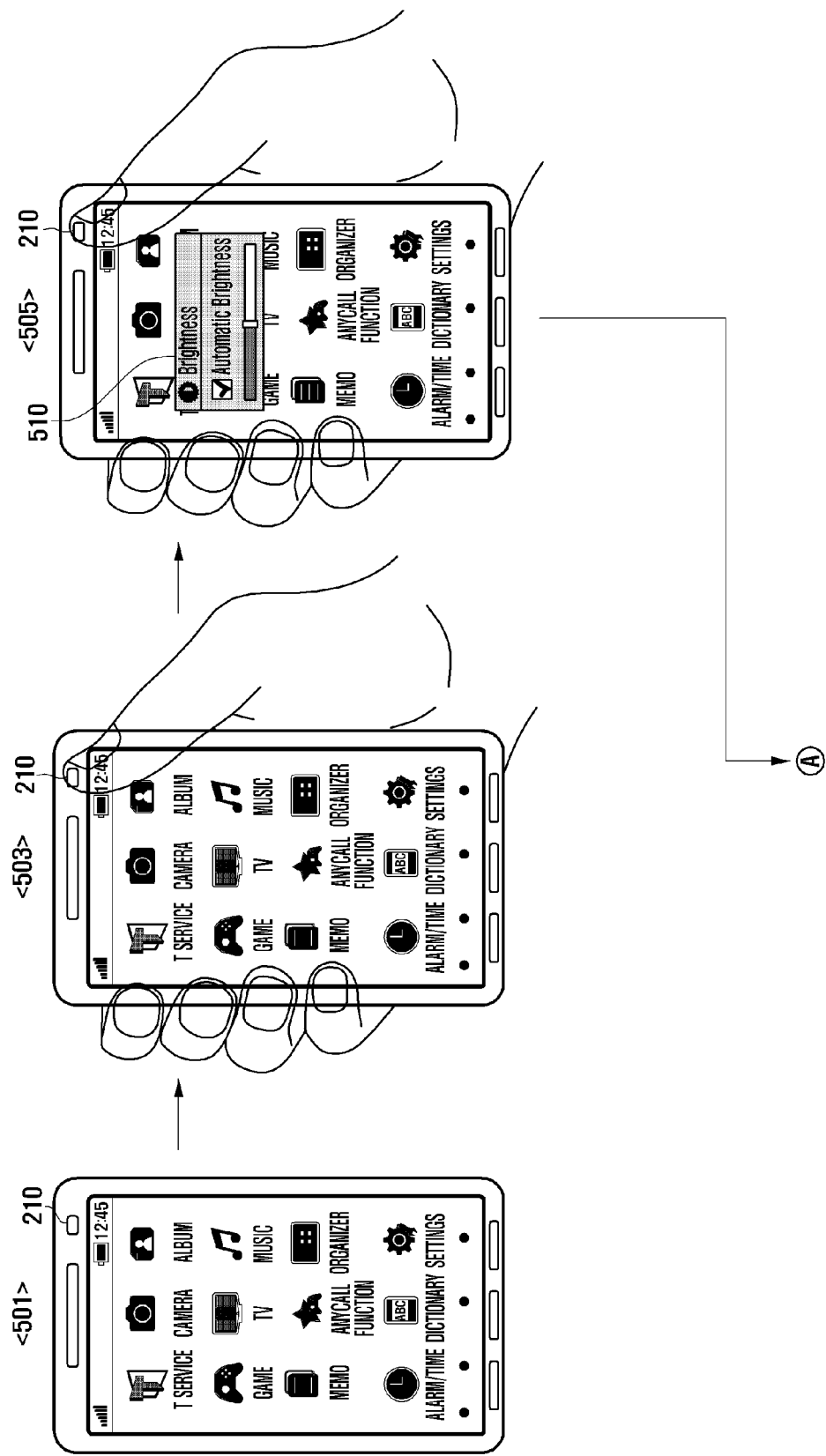

METHOD FOR SETTING A VALUE OF OPTIONS OF OPERATIONAL ENVIRONMENT IN A USER DEVICE AND USER DEVICE ADAPTED THERETO

PRIORITY

This application claims priority under 35 U.S.C. §119(a) to a Korean Patent Application filed on Feb. 8, 2012 in the Korean Intellectual Property Office and assigned Serial No. 10-2012-0012852, the entire disclosure of which is hereby incorporated by reference.

BACKGROUND OF THE INVENTION

1. Field of the Invention

The present invention relates generally to setting options in a user device and more particularly to a method and a user device that allows a user to intuitively, simply alter the setting of options of an application that is being executed in the user device.

2. Description of the Related Art

With the rapid development of digitized technology, a variety of portable user devices that can perform communication and process user information have been released on the market. Examples of such user devices are mobile communication terminals, Personal Digital Assistants (PDAs), electronic organizers, smart phones, tablet PCs, etc. That is, user devices have been developed to include additional functions as well as their usual communication functions such as a voice call, and message transmission and reception. Examples of the additional functions include a video call, an electronic organizer function, a photographing function, an emailing function, a broadcast reproducing function, an Internet function, an audio playback function, a scheduling function, Social Networking Service (SNS), as well as messenger, dictionary, and game functions, etc.

Conventional user devices can set or alter the options of a user device (e.g., volume, display brightness, network, language, etc.), via additional mechanical keys, e.g., a shortcut button for controlling volume. However, if they are not equipped with such separate keys, the users must execute a settings menu, find a corresponding option to be set, and then alter the value of the option. For example, if a user of a user device, not equipped with buttons as hardware components, needs to alter an option such as display brightness while executing an application, the user must pause on the executed application, alter the level of brightness of the display via a setting menu on the home screen, etc., and then resume the application. If the user of the user device needs to alter a network option (e.g., Wi-Fi, 3G, etc.), the user must access the network option via the indicator menu to turn the network operation on/off or select one of the Wi-Fi Access Points (Wi-Fi APs) that the user device has searched for.

As such, if a user needs to alter one of the options in a user device where a number of applications are executed, he/she must stop executing all the executed applications and then set the option. Alternatively, he/she must execute a multitasking mode, execute a menu of a number of depths, set the option, and then re-execute the previously executed mode. These multi-step operations inconvenience the device user. That is, if the user of conventional user devices that are not equipped with software or hardware function buttons, needs to alter the options while an application is being executed, the user must stop the currently executed application, execute a menu for setting options, alter corresponding options, and resume executing the application.

The displays of user devices may need to be set at different levels of brightness according to applications, such as an e-book reader or a video player. However, if an option is altered for an application in a conventional user device, the user device applies it to the entire application. For example, if brightness is altered to a certain level for a certain application in a user device, the user device also applies the altered level of brightness to the other applications. That is, conventional user devices allow for only the level of brightness for the entire screen; however, they don't support the adjustment of the level of brightness for respective applications.

SUMMARY OF THE INVENTION

The present invention has been made in an effort to overcome the above problems and disadvantages, and to provide the advantages discussed below. An aspect of the present invention provides a system and method that allows a user to set options in a user device via a sensor module, intuitively, in real time.

An aspect of the present invention further provides a system and method that allows a user to set options for applications, independently and respectively, store the set options for the exclusive use of corresponding applications, and manage them for the corresponding applications.

An aspect of the present invention further provides a system and method that allows a user to simply alter options in a user device while an application is being executed, via the sensor module, without stopping the execution of the application in order to alter the settings of the user device.

An aspect of the present invention further provides a system and method that enhances use convenience and competitiveness of a user device, by achieving an environment so that the user can optimally alter the options of the device.

In accordance with an aspect of embodiments of the invention, a method for setting options of a user device includes detecting interactions via a sensor module during execution of a specific mode; identifying an option corresponding to a detected interaction; altering an option setting value of the identified option according to a detected interaction, and displaying the altered option setting value; and storing the option of the specific mode with the altered option setting value.

In accordance with another aspect of embodiments of the present invention, a user device includes a sensor module for detecting a change in state of the user device, wherein the sensor module includes one or more sensors; a storage unit for storing one or more options according to respective modes of the user device and one or more option setting values according to each of the options; a display unit for displaying a guide message pop-up window for showing a message for setting an option in a specific mode; and a controller. The controller manages option setting values of one or more options for each of the modes, and alters, if an interaction is detected via the sensor module in a specific mode, the option setting values according to the interaction. The controller operates the option of the specific mode with the altered option setting values.

BRIEF DESCRIPTION OF THE DRAWINGS

The features and advantages of the present invention will become more apparent from the following detailed description viewed in conjunction with the accompanying drawings, in which:

FIGS. 5A to 5C illustrate screens when options are altered in a user device, according to an embodiment of the invention.

DETAILED DESCRIPTION OF EMBODIMENTS OF THE PRESENT INVENTION

Figure 1:
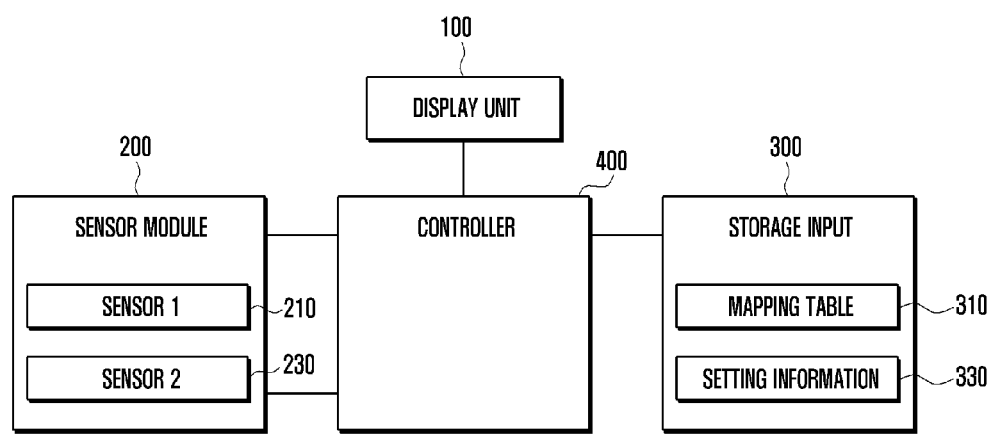
FIG. 1 illustrates a block diagram of a user device according to an embodiment of the invention.

Hereinafter, embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

The present invention relates to a system and method that allows a user to easily set/alter options for a variety of functions of a user device. In this description, the term 'option(s)' refers to all objects/selections that can be set to alter the values of functions supported by the user device. Examples of the options include, but are not limited to, brightness of the display, audio volume, network, language format (e.g., color, language, font, size, etc.), notification mode (e.g., sound, vibration, no-sound, etc.), alarm, etc. If options may be set/altered in such a way that the setting value for a corresponding function is increased/decreased, the switch for a corresponding function is toggled so that the function is turned on/off, etc.

The system and method set options for respective applications executed in a user device. The system and method associates the set options with the respective applications and stores them, so that the applications can be executed with the respectively set options. That is, the system and method set options according to applications and manage them respectively. The system and method set/alter options for a corresponding application that is being executed, without stopping the execution of the application, thereby providing the device user with use convenience.

The system and method set options in a user device via one or more sensors. That is, the system and method adaptively alter options while an application is being executed in a user device, via one or more sensors installed to the user device. In particular, the system and method manage the values of options according to applications, so that the respective applications can be executed based on the last set options. The system and method provides a user interface (UI) that allows a user to simply and intuitively set/alter options, e.g., brightness of a display, etc., when applications are being executed.

In the following description, the configuration and operation of a user device according to the invention will be explained in detail referring to the drawings. It should be understood that the invention is not limited to the following embodiments. It will be noted that there may be many modifications from the embodiments.

FIG. 1 illustrates a block diagram of a user device according to an embodiment of the invention.

Referring to FIG. 1, the user device includes a display unit 100, a sensor module 200, a storage input 300, and a controller 400. Although it is not shown in the drawings, it will be noted that the user device may further include: an audio processing unit with a microphone and a speaker; a digital broadcast module for receiving and playing back digital broadcasts (e.g., mobile broadcasts related to Digital Multimedia Broadcasting (DMB), Digital Video Broadcasting (DVB), etc.); a camera module for photographing pictures/video; one or more short-range wireless communication modules for supporting short-range wireless communication, such as Bluetooth communication, Infrared Data Association (IrDA) communication, Radio Frequency IDentification (RFID) communication, Near Field Communication (NFC), etc.; an input unit for supporting an input function based on hard keys; a Radio Frequency (RF) module for supporting a mobile communication-based voice/video call, and a data communication function; a communication module for supporting Internet Protocol (IP) based Internet communication services; a battery for supplying electric power to the components listed above; etc. Since these elements are well-known to an ordinary person skilled in the art, a detailed description is omitted in the following description.

The display unit 100 displays various types of screens related to the operation states of the user device. For example, the display unit 100 may display a home screen, a menu screen, an outgoing call screen, a message writing screen, a chat screen, and screens when applications are executed. In particular, the display unit 100 can display an interface screen for setting options of the user device. For example, the display unit 100 may display a pop-up window for informing the user of the values of options according to the user's input interactions while a corresponding application is being executed. A detailed description regarding the screens that the display unit 100 displays will be explained later referring to the accompanying drawings.

The display unit 100 may be implemented with a Liquid Crystal Display (LCD), Light Emitting Diodes (LEDs), Organic Light Emitting Diodes (OLEDs), Active Matrix Organic Light Emitting Diodes (AMOLEDs), or the like. The display unit 100 may be implemented with a touch-based interface, e.g., a touch screen. If the display unit 100 is implemented with a touch screen, it can support various types of user's inputs, creates corresponding signals, and transfers them to the controller 400. The display unit 100 can display the screens described above in a landscape mode or portrait mode according to a rotation direction of the user device (or an orientation where the user device is placed) or in a display mode where the screen is adaptively switched between a landscape mode and a portrait mode according to the horizontal and vertical postures of the user device.

The sensor module 200 detects one or more changes in posture of the user device, illumination of the outside, the acceleration, etc., and transfers the detected signals to the controller 400. That is, the sensor module 200 detects the changes in state of the user device, creates the detected signals and transfers them to the controller 400. The sensor module 200 may be implemented with a number of sensors (sensor 1 and sensor 2). The sensors of the sensor module 200 can be activated under the control of the controller 400 when the user device is turned on or according to the user's settings, and detect the changes in state of the user device. The sensor module 200 may be always activated to detect the changes in state of the user device. In that case, the battery of the user device increases the electric power consumption. Alternatively, the activation of the sensor module 200 may be set via a user's pre-settings, the option altering function, or a user's manual operation.

The sensor module 200 may be implemented with one or more sensors that can detect the changes in state of the user device, for example, an acceleration sensor, a gyro sensor, an illuminance sensor, a proximity sensor, a pressure sensor, a noise sensor (e.g., a microphone), a video sensor (e.g., a camera module), etc. In an embodiment of the present invention, it is assumed that the sensor module 200 is implemented with a combination of two sensors, Sensor 1 (e.g., an illuminance sensor) and Sensor 2 (e.g., a gyro sensor). Although the embodiment of the present invention is described via a combination of two sensors configuring the sensor module 200, it should be understood that it may also be implemented with one sensor or a combination of three or more sensors. That is, the types and number of sensors in the sensor module 200 may be determined according to operation modes for setting options of the user device or types of options of respective applications. A detailed description regarding the method for setting options via the sensor module 200 will be described in detail later.

The storage input 300 stores data and applications executed in the user device. The storage unit 300 is comprised of one or more volatile memory devices and non-volatile memory devices. The storage input 300 includes at least one of Read Only Memory (ROM), flash memory, Random Access Memory (RAM), internal hard disk, external hard disk, external storage media, etc. The storage unit 300 may permanently or temporarily store an Operating System (OS) of the user device, data and programs related to the display control of the display unit 100, data and programs related to the control operations for setting options of the user device via the sensor module 200, etc. In an embodiment of the present invention, the storage unit 300 includes a mapping table 310 and setting information 330.

The mapping table 310 stores, in table form, information regarding sensors of the sensor module to be activated to set options of a user device, types of options set via the sensor module, types of operations for setting the options, etc., according to applications. An example of the mapping table 310 is described in the following Table 1.

TABLE 1

| Applications | Sensor Module | Options | Remarks |
|---|---|---|---|
| Video | Sensor 1 + Sensor 2 | Display brightness | Execute Event via Sensor 1; Set option via Sensor 2 |
| Music | Sensor 1 + Sensor 2 | Volume | Execute Event via Sensor 1; Set option via Sensor 2 |
| Network | Sensor 1 + Sensor 2 | Toggle Wi-Fi ON/OFF | Execute Event via Sensor 1; Set option via Sensor 2 |
| Network | Sensor 1 | Toggle Wi-Fi ON/OFF | Set option according to interaction |
| Email | Sensor 1 | Toggle Font (Size/Color/Letter) | Set option according to interaction |
| Messenger | Sensor 1 | Toggle Language (Korean/English/Number/Symbol) | Set option according to interaction |
| Messenger | Sensor 1 + Sensor 2 | Toggle Language (Korean/English/Number/Symbol) | Execute Event via Sensor 1; Set option via Sensor 2 |
| Photograph | Sensor 1 + Sensor 2 | Display brightness | Execute Event according to $1^{st}$ interaction via Sensor 1; Execute Event according to $2^{nd}$ interaction via Sensor 2 |
|  |  | Toggle Wi-Fi ON/OFF | Execute Event according to $3^{rd}$ interaction via Sensor 1; Execute Event according to $4^{th}$ interaction via Sensor 2 |
| Photograph | Sensor 1 | Display brightness | Set option according to $1^{st}$ interaction |
|  |  | Toggle Wi-Fi ON/OFF | Set option according to $2^{nd}$ interaction |
| . . . | . . . | . . . | . . . |

As described in Table 1, the system and method according to the invention allows a user to set one or more options by applications. The system and method uses one or more sensors to support the option setting while a corresponding application is being executed. Alternatively, the system and method also supports one or more interactions according to the sensors configured to set options for the respective applications.

Referring to Table 1, the video application can set the display brightness via Sensor 1 and Sensor 2 in such a way that, when an event for setting the option, display brightness, occurs according to an interaction detected via Sensor 1, i.e., the option setting mode is executed, the user can set/alter the option, display brightness, by inputting interactions that are detected via Sensor 2.

Referring to Table 1, the photograph application can set options: display brightness; and network by toggling between Wi-Fi on and Wi-Fi off. The display brightness of the photograph application can be set in such a way that when an event for setting the option according to a first interaction detected via Sensor 1 occurs, i.e., the option setting mode is executed, the user can set/alter the option by inputting a second interaction detected via Sensor 2. Likewise, the network option, Wi-Fi, of the photograph application can be set in such a way that when an event for setting the option according to a third interaction detected via Sensor 1 occurs, the user can toggle between Wi-Fi on and Wi-Fi off by inputting a fourth interaction detected via Sensor 2. In an embodiment of the present invention, the second interaction for setting the display brightness and the fourth interaction for the network option may be the same type of interaction.

In addition, the photograph application can set the options display brightness and network by toggling between Wi-Fi on and Wi-Fi off, by using one sensor (e.g., Sensor 1). In that case, the display brightness of the photograph application can be set in such a way that the option setting mode is executed via an interaction detected via Sensor 1 and the option is also altered/set, via an interaction detected via Sensor 1. Likewise, the network option, Wi-Fi, of the photograph application can be set in such a way that the option setting mode is executed via an interaction detected via Sensor 1 and the network option is toggled between Wi-Fi on and Wi-Fi off via an interaction detected via Sensor 1.

As such, the system and method according to the invention map one or more options to the respective applications, and alter the values of the mapped options via one or more sensors. The system and method also map one or more input modes according to one or more sensors allocated for the option setting, thereby to set options and operate them. The mapping table may be created and altered according to the user device manufacturer's settings or the device user's settings.

The setting information 330 refers to information related to the option settings according to respective applications of the user device, for example, information as to whether a pop-up window indicating that an option has been set is displayed, one or more set values of options independently set according to respective applications, and set values of respective options for the entire settings of the user device.

The controller 400 controls the entire operation of the user device. In particular, the controller 400 controls the operations related to the functions according to the options that are set according to the applications, via the sensor module 200. For example, the controller 400 executes a mode for setting an option according to interactions detected via the sensor module 200 when an application is being executed, and allows the user to set the values of the option in the option setting mode according to interactions detected via the sensor module 200. When the controller 400 executes the option setting mode, it may also display the method for setting the option and the altered values of the option according to the interactions via a pop-up window. In addition, the controller 400 may display the altered value of the option according to the interaction via the pop-up window, in real time, and may also reflect it to the user device in real time.

To this end, the controller 400 detects an interaction via the sensor module 200 while the user device operates in a specific mode, identifies a type of sensor in the sensor module 200 where the interaction has been created, a type of interaction detected via the sensor, and a type of option corresponding to the interaction and the sensor in the specific mode, and alters the value of the option based on the identified results.

As described above, the controller 400 controls the entire operation related to the functions according to the present invention, and a detailed description will be provided later referring to the accompanying drawings. The controller 400 also controls the operations related to the usual functions of the user device. For example, when the controller 400 executes an application, it controls the operations and display corresponding screen data. The controller 400 receives signals input in a variety of input modes that the touch-based input interface supports, and controls corresponding functions. The controller 400 also controls the data transmission/reception via wired or wireless communication.

The user device according to the present invention as shown in FIG. 1 includes all information communication devices, multimedia devices, and their applications, which are operated according to communication protocols corresponding to a variety of communication systems. For example, the user device can be applied to mobile communication terminals, tablet personal computers, smartphones, digital cameras, Portable Multimedia Players (PMPs), media players, mobile game players, portable computers, Personal Digital Assistants (PDAs), etc.

Figure 2:
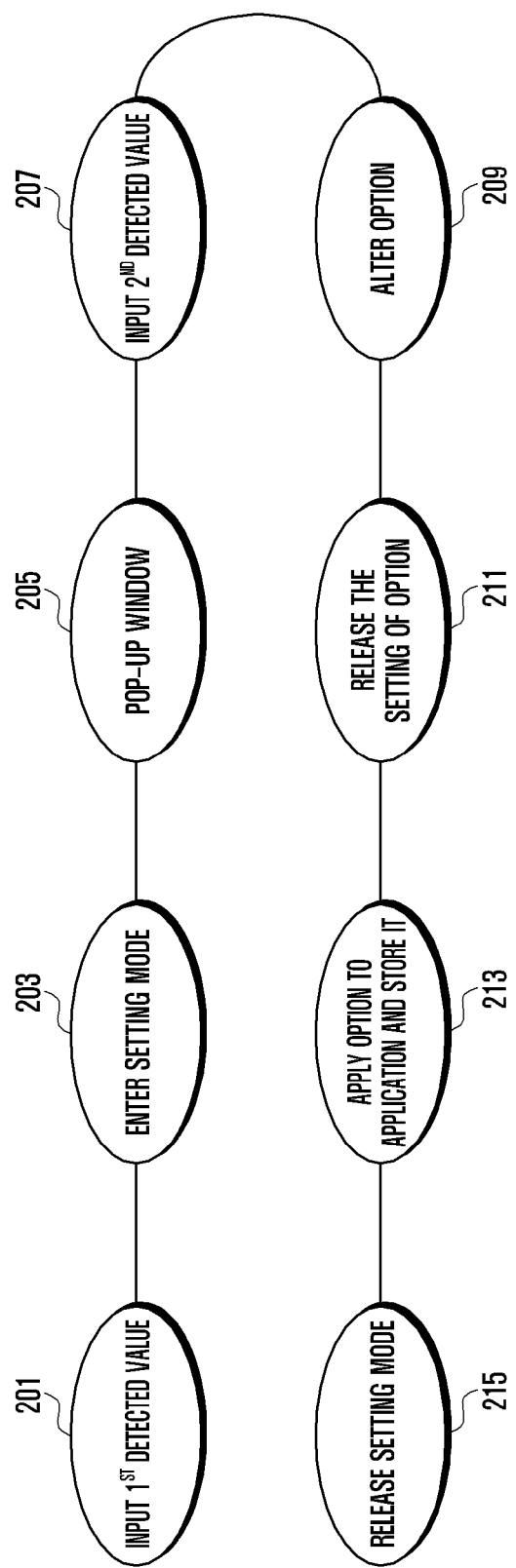
FIG. 2 illustrates a chart that describes a method for altering options in a user device, according to an embodiment of the invention.

FIG. 2 illustrates a chart that describes a method for altering options in a user device, according to an embodiment of the present invention.

This embodiment is described assuming that the sensor module 200 is implemented with two sensors, Sensor 1 and Sensor 2. It is also assumed that the display unit displays a screen when a specific application (e.g., a video application) is executed.

While displaying the execution screen of an application on the display unit, the controller 400 receives a first detected value via Sensor 1 at 201. For example, when the user device displays an execution screen on the display unit, the user may block the illuminance sensor via an object (e.g., a finger). In that case, the illuminance sensor detects the change in the state of the user device (e.g., the change in the amount of received light) and transfers the detected signal (as a first detected value) to the controller 400. When an option setting function is operated via a combination of sensors, a signal detected via Sensor 1 may be maintained or may be created only once at the initial time. For example, according to types of modes for operating an option setting function, a user's operation to block an illuminance sensor may be maintained or may be released after the user blocks the illuminance sensor, only once, initially. If the option setting function is set by the former mode, the controller detects only the user's blocking operation in the former mode, as an effective input, and doesn't detect the user's operation in the latter mode. On the contrary, if the option setting function is set by the latter mode, the controller detects only the user's blocking operation in the latter mode, as an effective input, and doesn't detect the user's operation in the former mode.

After receiving the first detected value from Sensor 1, the controller 400 executes an option setting mode to set options of the executed application at 203. The controller 400 identifies the currently executed application when receiving the first detected value, and a sensor module mapped thereto. After that, the controller 400 determines whether the first detected value by the identified sensor module corresponds to a value for trigging the option setting start. If the controller 400 ascertains that the first detected value corresponds to a value for trigging the option setting start, it detects the mapped option. For example, if a video application is currently being executed, the controller 400 identifies whether the first detected value is detected by Sensor 1, referring to Table 1 described above. If the controller 400 ascertains that the first detected value is detected by Sensor 1, it concludes that it is a value as an option setting start and that the option to be altered is the display brightness.

After that, the controller 400 controls the display of a pop-up window for showing the information messages for setting options in the option setting mode at 205. For example, if the controller 400 identifies the validity of the first detected value and ascertains that it is a value to execute the option setting mode, it controls the display unit 100 to display a pop-up window that shows the information for setting options mapped to the application. If the option is a display brightness option, the controller 400 controls the display unit 100 to display a pop-up window related to the display brightness settings. If the option is a volume option, the controller 400 controls the display unit 100 to display a pop-up window related to the volume settings. If the option is a network option, the controller 400 controls the display unit 100 to display a pop-up window related to the network settings.

The controller 400 receives a second detected value via Sensor 2, while displaying the pop-up window at 207. For example, while the pop-up window is being displayed on the display unit 100, the user may move the user device to the right or left (that is, the user may move the user device to the right or left with respect to the front screen displaying the pop-up window that he/she watches). In that case, the acceleration sensor detects the change in state of the user device (i.e., the posture) and transfers the detected signal (e.g., second detected value) to the controller 400. In an embodiment of the present invention, the controller 400 receives the second detected value from the acceleration sensor while receiving the first detected value from the illuminance sensor. That is, the user can move the user device to the right or left, while blocking the illuminance sensor. In addition, the controller 400 may continue to receive the second detected value corresponding to the movement of the user device moves (i.e., the change in posture) while it moves.

After that, the controller 400 alters the options of the application according to the second detected values and controls the corresponding functions at 209. For example, if the option is a display brightness option, the controller 400 increases/decreases the level of brightness according to the change in posture of the user device. If the option is a volume option, the controller 400 increases/decreases the audio volume according to the change in posture of the user device.

While the controller 400 is applying the option setting according to the change in the state of the user device to the executed application, it detects a release operation of the option setting at 211. For example, when the user device alters an option according to the user's request, the user can stop creating the second detected value in the user device. That is, if the user device has altered the display brightness to a user's desired level as the user moves the user device to the right or left, the user device may stop receiving the inputs from Sensor 1 and Sensor 2. In particular, if the user device is operated in a mode where the controller 400 detects the change in state of the user device and alters the option setting while the user is blocking the illuminance sensor, it can complete the option setting as the user releases the blocking motion with respect to the illuminance sensor. In that case, the acceleration sensor stops detecting the change in state of the user device. In addition, the user device may maintain the option value that was set immediately before the first detected value from the illuminance sensor is released.

When the controller 400 detects the release operation for the option setting, it applies the option value, set (or has been altered) immediately before the option setting is released, to the application and stores it at 213. That is, the controller 400 applies the altered option value to the application and stores it. After that, if the application is executed, the controller 400 controls the output of the application based on the stored option value. The controller 400 then releases the option setting mode at 215. The altered and stored option corresponds to the option alteration of the executed application. The default option set in the user device is maintained. For example, in a state where a level of display brightness, as a default value, set in the user device is '5,' if an option to be set is the display brightness option for an application and it is controlled to alter the level from '5' to '7,' the level of display brightness for the application is altered to '7' and it is applied to the application. However, the user device still maintains the default level of display brightness as '5.' That is, the controller 400 controls the display with a level of brightness '7,' while the application is executed, and with the default level of brightness '5,' after the application is terminated.

Figure 3:
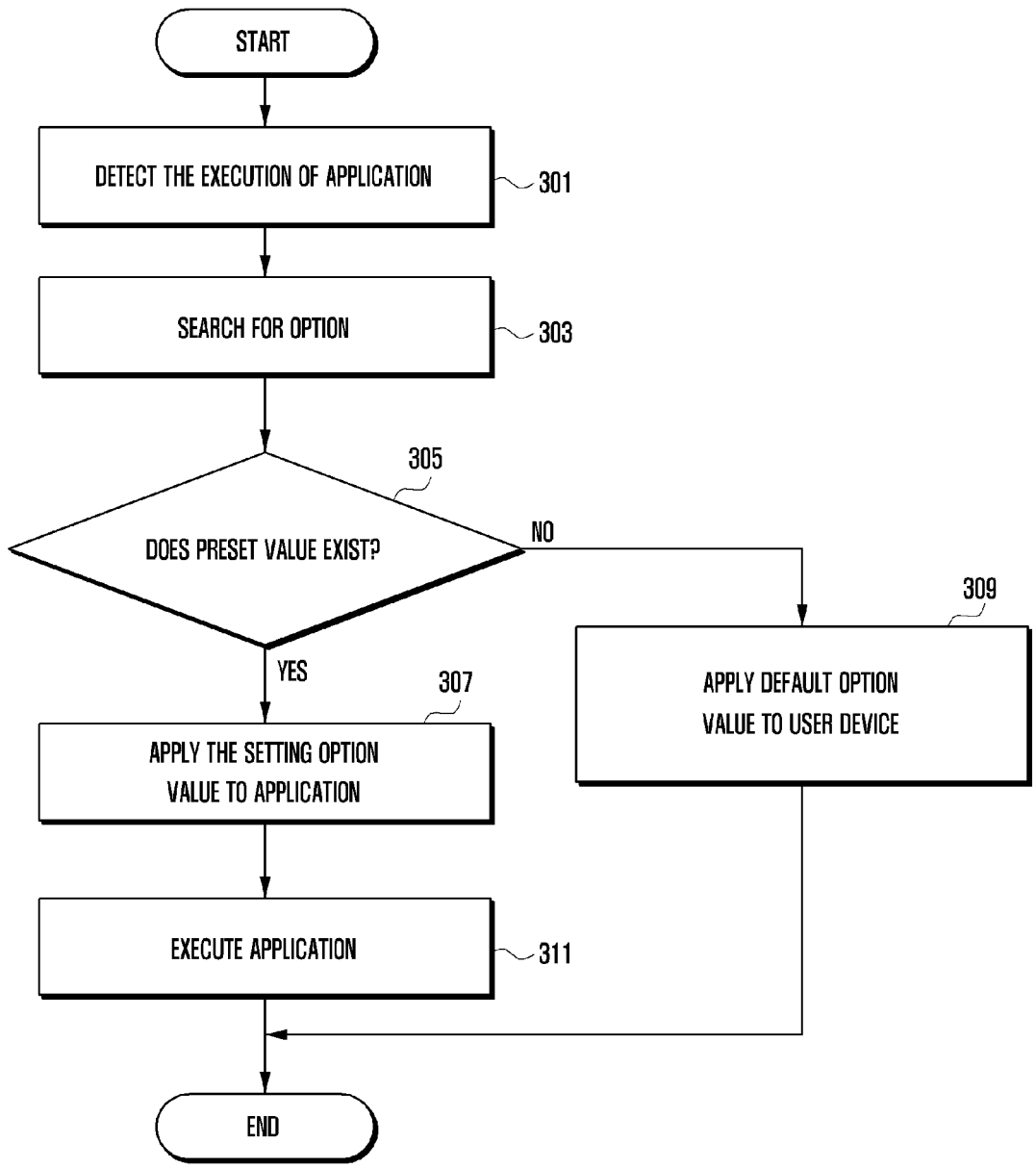
FIG. 3 is a flow chart of a method for executing an application in a user device according to an embodiment of the invention.

FIG. 3 illustrates a flow chart that describes a method for executing an application in a user device according to an embodiment of the invention.

Referring to FIG. 3, when the controller 400 detects the execution of an application in step 301, it searches for an option and the option setting values mapped to the application in step 303. The controller 400 determines whether the option and the option setting values set to the application exist in step 305. That is, when the controller 400 ascertains that the user requests to execute the application in the user device, it identifies the user's requested application. After that, the controller 400 searches for the option and the option setting values for the identified application, set according to the user's definition, by referring to a mapping table (for example, Table 1) as described above.

If the controller 400 ascertains that the option and the option setting values set to the application exist at step 305, it applies them to the application in step 307. The controller 400 may apply only the option setting values of the option to the application and the default option setting values for the remaining options of the user device. For example, if the application is set in such a way that only the display brightness option can be altered with the option setting values, the controller 400 applies only the setting values of the display brightness option to the application and sets the remaining options (e.g., volume, display size, landscape/portrait mode, language, etc.) with the default option setting values respectively.

After that, in step 311, the controller 400 executes the application with the option set at step 307.

On the contrary, if the controller 400 ascertains that the option and the option setting values set to the application don't exist at step 305, it can set all the options of the application, with the default option setting values, respectively, set in the user device in step 309.

After that, in step 311, the controller 400 executes the application with the options set with the option values in step 309.

Figure 4:
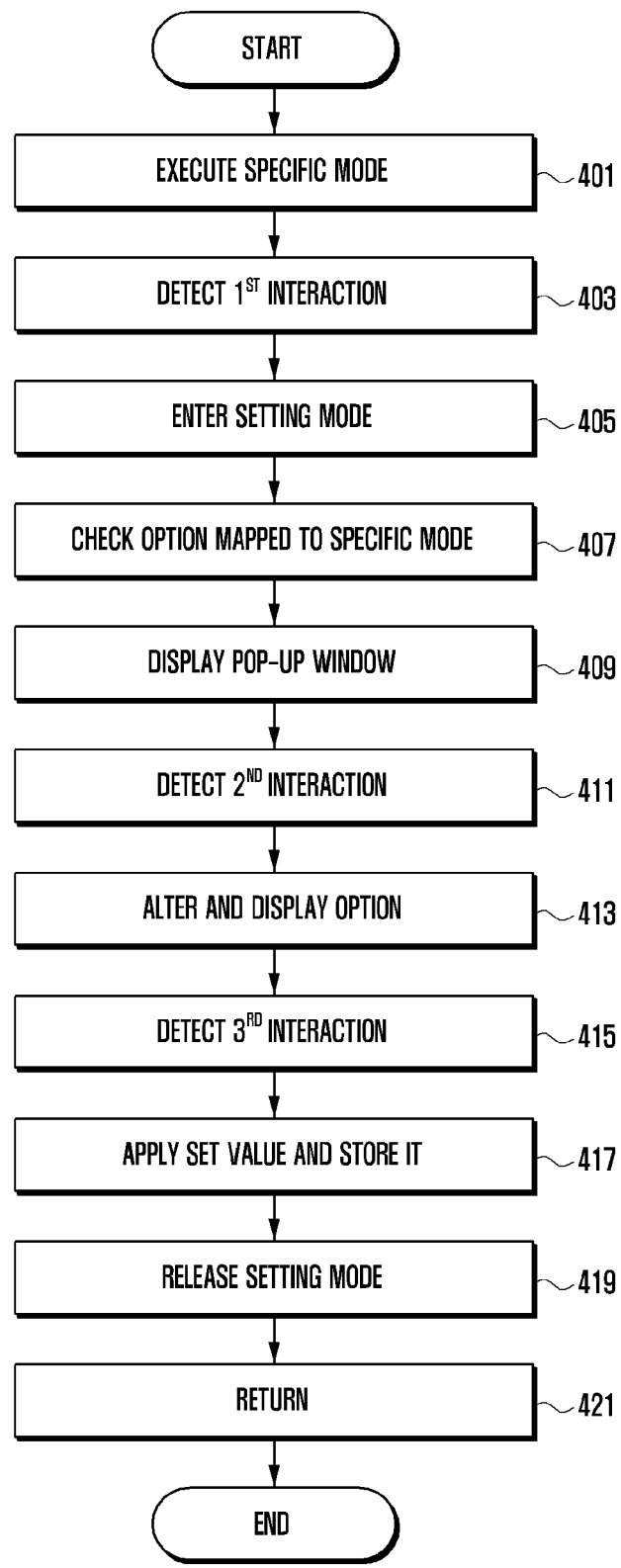
FIG. 4 is a flow chart of a method for altering options in a user device according to an embodiment of the invention.

FIG. 4 illustrates a flow chart that describes a method for altering options in a user device according to an embodiment of the invention.

Referring to FIG. 4, the controller 400 of a user device executes a specific mode according to the user's request and controls the operation of the specific mode in step 401. Alternatively, the controller 400 has executed an application and controlled it.

When the controller 400 detects a first interaction via the sensor module 200 while the specific mode is executed in step 403, it executes an option setting mode in step 405. The first interaction refers to a user's input interaction for executing an option setting mode. For example, the first interaction may be a user's motion for blocking the illuminance sensor with an object (e.g., a finger, etc.). In that case, the illuminance sensor detects the change in state of the user device (e.g., the change in amount of light) and transfers the detected signal (or a first detected value) to the controller 400.

When receiving the first detected value from the illuminance sensor, the controller 400 identifies it as a first interaction for executing an option setting mode and executes the option setting mode for the executed specific mode.

When the controller 400 executes the option setting mode, it identifies an option mapped to the specific mode in step 407 and then outputs a pop-up window for informing how to set options of the mapped option in step 409. For example, if the controller 400 identifies that the mapped option is a display brightness option, it outputs a pop-up window informing how to set the level of display brightness.

When the controller 400 detects a second interaction via the sensor module 200 while the pop-up window is displayed in step 411, it alters the option setting corresponding to the second interaction and controls the output of the alteration in step 413. The second interaction refers to a user's input interaction for altering the option setting, referring to the pop-up window. For example, the second interaction may be a user's motion, such as a movement of the user device to the right/left, up/down, back/forth, etc. In that case, the acceleration sensor detects the change in state of the user device (e.g., the change in posture, gravity, acceleration, etc.) and transfers the detected signal (or a second detected value) to the controller 400.

When receiving the second detected value from the acceleration sensor, the controller 400 identifies it as a second interaction for altering an option setting, alters the setting of the option for an application according to the second detected value, and controls the output of the altered state. If the option is a display brightness option, the controller 400 may increase/decrease the level of display brightness according to the second detected value. For example, if the user gradually tilts the user device to the right with respect to the center axis of the user device, the controller 400 may increase the display brightness in proportion to the degree of tilt. Likewise, if the user gradually tilts the user device to the left with respect to the center axis of the user device, the controller 400 may decrease the display brightness in proportion to the degree of tilt. In addition, if the option is an audio volume option, the controller 400 may increase/decrease the level of audio volume according to the second detected value. For example, if the user gradually tilts the user device to the right with respect to the center axis of the user device, the controller 400 may increase the audio volume in proportion to the degree of tilt. Likewise, if the user gradually tilts the user device to the left with respect to the center axis of the user device, the controller 400 may decrease the audio volume in proportion to the degree of tilt.

If the controller 400 detects a third interaction via the sensor module 200 while altering the option setting according to the user's input second interaction and outputting the alteration in step 415, it applies the altered option value to the application and stores it according to the third interaction in step 417. The third interaction refers to a user's input interaction for terminating the option setting operation that has been processed via the second interaction. For example, the third interaction may be a user's motion for unblocking an object (e.g., the user's finger), which has blocked an illuminance sensor of the user device, from the illuminance sensor. In that case, the illuminance sensor detects the change in state of the user device (e.g., the change in amount of light) and transfers the detected signal (or a third detected value) to the controller 400.

When receiving the third detected value from the illuminance sensor, the controller 400 identifies it as a third interaction for terminating the option setting operation, i.e., the option setting mode, and applies the option setting value, altered according to the second interaction, to the specific mode and stores it. The option setting value to be applied and stored is the finally altered option setting value according to the second interaction. That is, the controller 400 applies the altered option value to the specific mode and stores it.

After altering the option setting value for the specific mode and storing it, the controller 400 releases the option setting mode in step 419 and returns to the state before the option setting mode is executed in step 421. When the controller 400 releases the option setting mode, it also removes the pop-up window from the screen. When the controller 400 returns to the state before the option setting mode is executed, it controls the returned state and the following states with the option setting values altered via the procedure described above. For example, the controller 400 controls the display unit with the level of display brightness that was altered via the option setting operation, and also outputs the audio sound with the level of audio volume that was altered via the option setting operation.

Figure 5B:
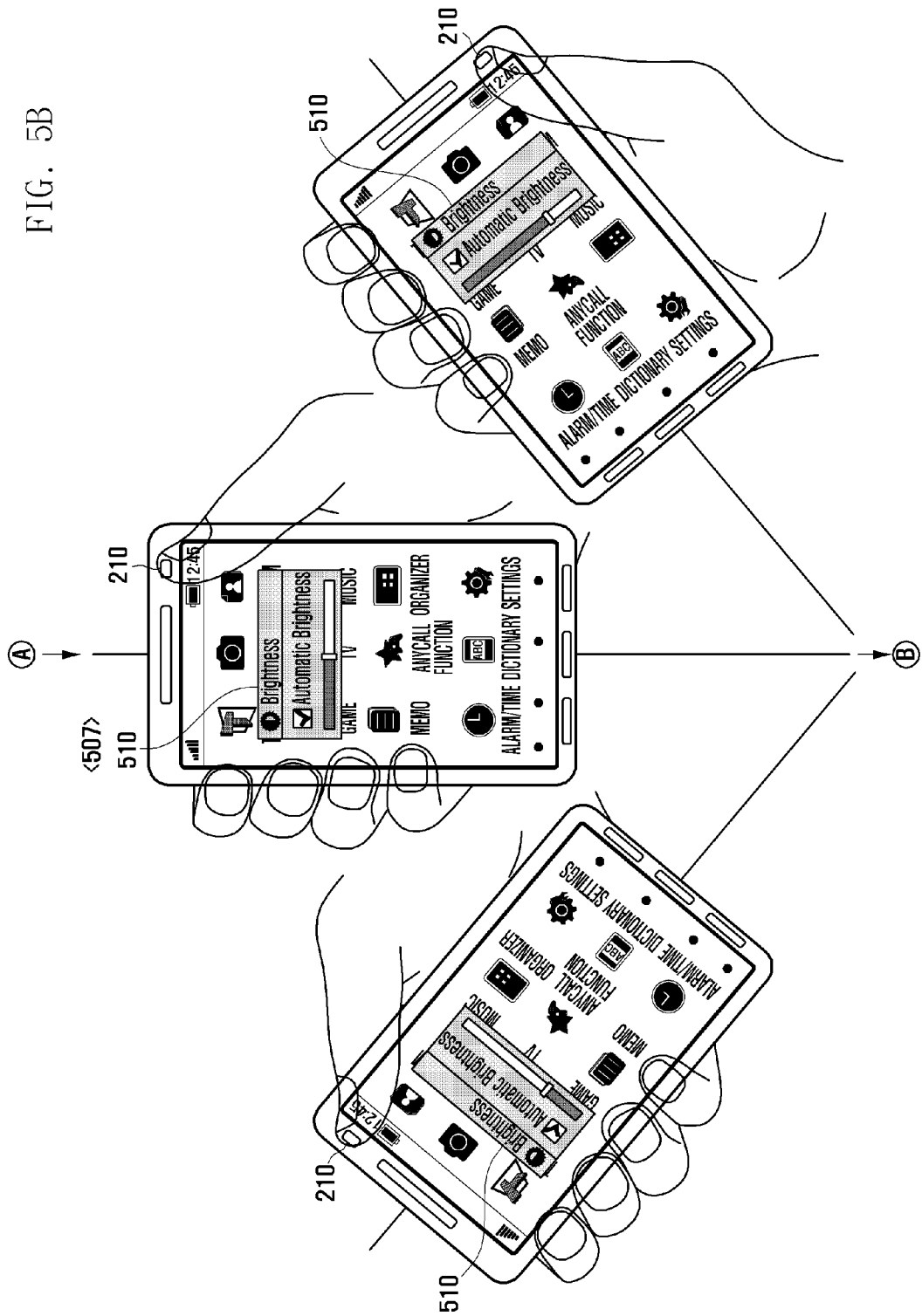
Figure 5C:
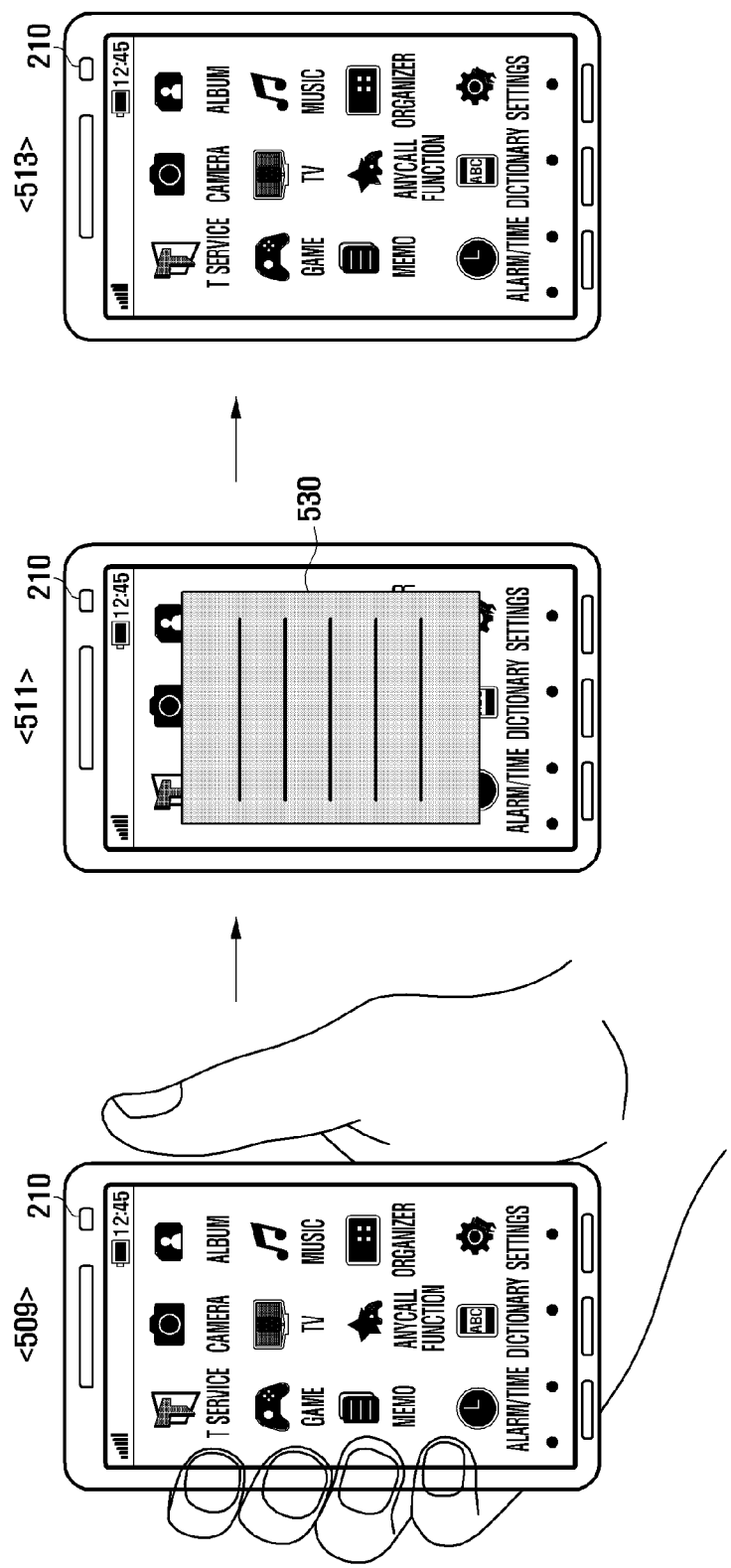

FIGS. 5A to 5C illustrate screens when options are altered in a user device, according to an embodiment of the present invention.

The following embodiment shown in FIGS. 5A to 5C is described where a display brightness option, as an example of an option in a user device, is set/altered in a specific mode (e.g., a standby mode showing a home screen), via an illuminance sensor 210 and an acceleration sensor (not shown).

As shown in diagram 501 of FIG. 5A, the user device operates in a specific mode and displays the corresponding screen. In order to adjust the level of display brightness, the user creates a first interaction for option activation, such as a motion for blocking the illuminance sensor 210 as shown in diagram 503. For example, the user can block the illuminance sensor 210 with the thumb while holding the user device.

When the controller 400 detects the first interaction via the illuminance sensor 210 of the user device in the specific mode, it displays a guide message showing pop-up window 510, showing that the option has been set and how to set the option, on the screen as shown in diagram 505. For example, if an option activated according to the first interaction is a display brightness option, the controller 400 displays a guide message showing pop-up window 510 that shows how to set the level of display brightness.

When the guide message showing pop-up window 510 is displayed on the screen as shown in diagram 505 while the user maintains the first interaction to the illuminance sensor 210, he/she can create a second interaction for altering/ setting the display brightness option as shown in diagram 507 of FIG. 5B. For example, if the user moves the user device to the right or left or makes a gesture to rotate the user device at a certain angle with respect to the center, the user device can alter the details.

When the controller 400 detects the second interaction via the acceleration sensor while the first interaction is maintained via the illuminance sensor 210 and the guide message showing pop-up window 510 is displayed on the screen, it alters the display brightness with the level of display brightness corresponding to the second interaction and controls the output. For example, as illustrated in diagram 507 of FIG. 5B, if the user tilts the user device to the right with respect to the center axis (i.e., if the user device is tilted to the right with respect to the normal state where the user views the front side of the screen of the user device), the controller 400 decreases the display brightness to a less level than the previous level in proportion to the degree of tilt. In that case, the controller 400 alters the information item (e.g., a brightness control progress bar, etc.) on the guide message showing pop-up window 510 in the altered level of display brightness. For example, the controller 400 moves the progress bar to the left with respect to the view point toward the user device. On the contrary, referring to diagram 507 of FIG. 5B, if the user tilts the user device to the left with respect to the center axis (i.e., if the user device is tilted to the left with respect to the normal state where the user views the front side of the screen of the user device), the controller 400 increases the display brightness to a greater level than the previous level in proportion to the degree of tilt. In that case, the controller 400 alters the information item (e.g., a brightness control progress bar, etc.) on the guide message showing pop-up window 510 in the altered level of display brightness. For example, the controller 400 moves the progress bar to the right with respect to the view point toward the user device.

The operation for altering the level of display brightness can be made step by step according to the degree of variation in the user's input second interaction. For example, if the user gradually increases the tilt of the user device, the level of display brightness is also altered corresponding to the degree of tilt, and this also alters the information that is displayed on the guide message showing pop-up window 510.

When the user alters the display brightness to a corresponding level via a motion as shown in diagram 507, the controller 400 can release the first interaction applied to the illuminance sensor 210, as shown in diagram 509 of FIG. 5C. That is, the user can move the thumb to unblock the illuminance sensor 210, thereby releasing the first interaction. Releasing the first interaction corresponds to a third interaction.

As such, when the controller 400 detects the third interaction via the illuminance sensor 210 while altering the level of display brightness according to the second interaction and displaying it, it removes the guide message showing pop-up window 510 from the screen as shown in diagram 509 of FIG. 5C. After that, the controller 400 displays an information showing pop-up window 530, asking the user whether the altered level of display brightness is applied to the user device, on the screen as shown in diagram 511. The information showing pop-up window 530 is provided to receive a user's selection as to whether the option setting alteration is applied to the user device. This embodiment may be modified in such a way that it doesn't include the process of outputting the information showing pop-up window 530.

After that, if the user makes a confirmation on the information showing pop-up window 530 or the user device is operated in an automatic mode that does not include a process for displaying the information showing pop-up window 530, the controller 400 applies the level of display brightness, at a time point that the third interaction is created as shown in diagram 509, to the display brightness in the specific mode and stores it. If the user device is operated in a mode that includes a process for displaying the information showing pop-up window 530, the controller 400 removes the information showing pop-up window 530 from the screen when the user makes a confirmation on the screen as shown in diagram 513, and displays the execution screen in the specific mode with the altered level of display brightness.

Figure 6:
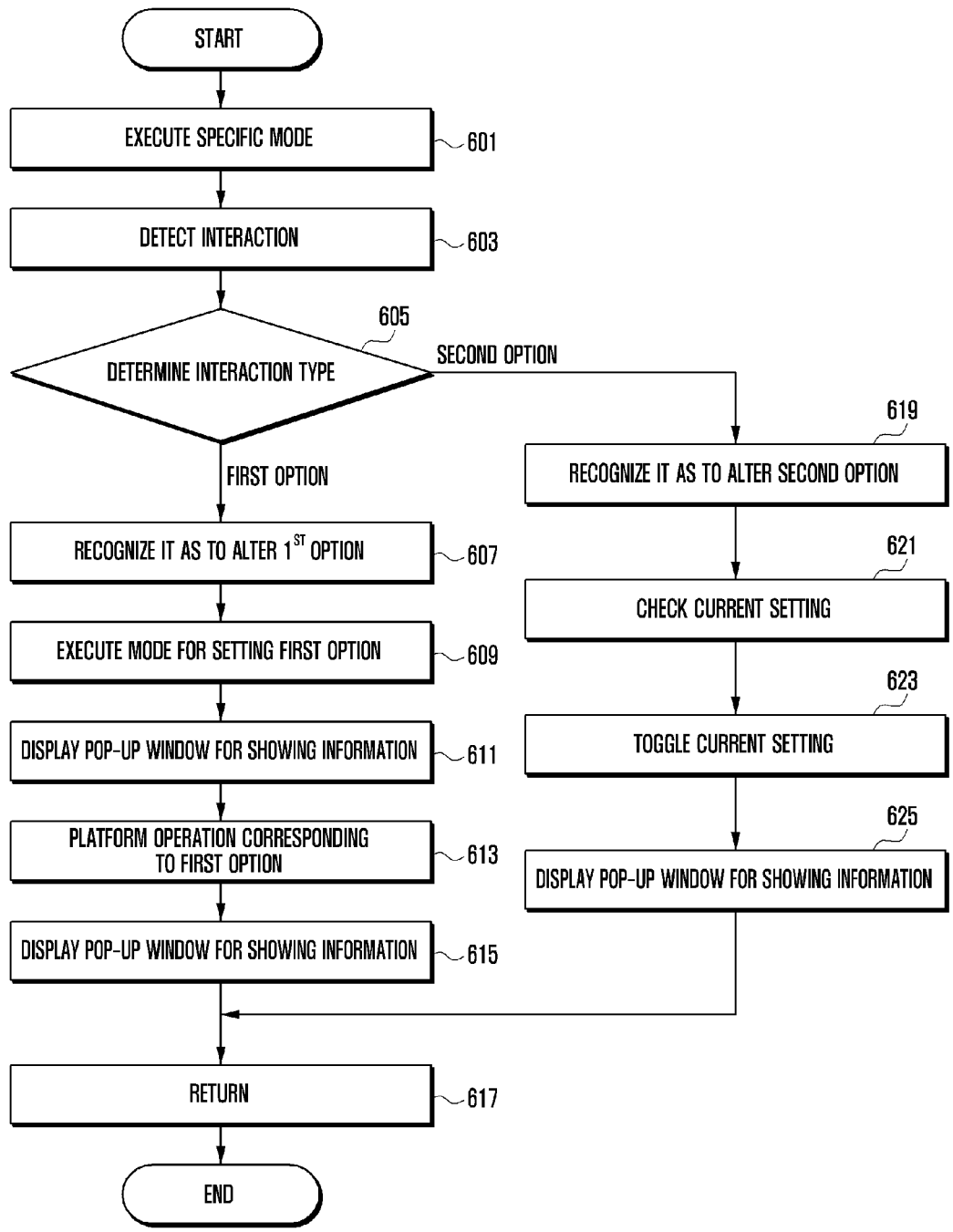
FIG. 6 is a flow chart of a method for altering options in a user device according to another embodiment of the invention.

FIG. 6 illustrates a flow chart of a method for altering options in a user device according to another embodiment of the invention.

This embodiment describes a method that sets a number of options (e.g., display brightness, volume option, language, network, etc.) for a specific mode. The user can set one or more options according to his/her inputs. That is, the embodiment will be described based on the photograph application described in Table 1 where it is mapped with one or more options (e.g., a display brightness option and a Wi-Fi on/off toggle option). The user can set/alter the respective options by applying interactions to the user device.

Referring to FIG. 6, the controller 400 executes and controls a specific mode according to the user's request in step 601. For example, the controller 400 may have executed and operates a specific application.

The controller 400 detects an interaction via the sensor module 200 in the executed specific mode in step 603. For example, the user applies an interaction for altering one or more options set for the specific mode to the sensor module 200. The interaction applied to the sensor module 200 may be an interaction for executing a user's opting setting mode. In particular, a number of options set for the specific mode may be respectively executed and set in the corresponding option setting modes. For example, the user can activate a first option via an interaction that keeps blocking the illuminance sensor of the user device and a second option via an interaction that repeats a preset number of times for blocking or unblocking the illuminance sensor with a finger (e.g., 3 times).

When the controller 400 detects the input interaction at step 603, it identifies the type of interaction in step 605. For example, if two options (e.g., a display brightness and network options) are set for the specific mode, the controller 400 determines whether the type of interaction is an interaction for setting one of the two options (a first option) or the other (a second option).

If the controller 400 ascertains that the identified interaction is an interaction mapped to the table for setting the first option in step 605, it concludes that it is an interaction for altering the first option in step 607. After that, the controller 400 executes an option setting mode to set the first option in step 609. When executing the option setting mode at step 609, the controller 400 outputs a pop-up window informing how to set/alter the first option in step 611.

After that, the controller 400 executes an operation for setting/altering the first option in step 613. For example, the user may set/alter the first option by changing the state of the user device, as described above. In that case, the controller 400 alters the first option according to the change in state of the user device and controls the output of the alteration.

When the first option has been set, the controller 400 outputs a pop-up window showing the guiding information according to the user's set mode in step 615. For example, if the output function of a pop-up window for showing a guiding message is set to display at a time point when an operation for setting an option has been completed, the controller 400 outputs the pop-up window, asking the user whether the altered option can be applied to the application, on the execution screen. The pop-up window showing a guiding message may be selectively provided so that the user can confirm a corresponding operation, e.g., whether the user confirms the option setting alteration. This embodiment may be modified in such a way that it doesn't include a process of displaying the pop-up window showing a guiding message. In addition, this embodiment may be implemented in such a way that the controller 400 displays only the information showing pop-up window. In that case, this embodiment serves to perform the function of the guide message showing pop-up window via the information showing pop-up window.

When the setting/altering operation of the first option has been completed via the processes described above, the controller 400 controls the user device to return to the state showing the previous execution screen in step 617. For example, if the controller 400 detects an interaction that has completed the setting of the first option or a user's final confirmation via the pop-up window, it terminates the option setting mode and controls the display unit to display the execution screen in the same specific mode as step 601. When the controller 400 controls the user device to return to the state showing the pervious execution screen, it applies the altered setting value of the first option to the execution screen and displays the screen.

If the controller 400 ascertains that the identified interaction is an interaction mapped to the table for setting the second option at step 605, it concludes that it is an interaction for altering the second option in step 619 and identifies the currently set value for the second option in step 621. For example, if the user creates an interaction for altering a network option (e.g., Wi-Fi service is turned on/off) in a specific mode, the controller 400 identifies whether the currently set value of the network option corresponds to an ON/OFF state. In addition, if the user creates an interaction for altering a language option (e.g., English to Korean or vice versa, etc.) in a specific mode, the controller 400 identifies whether the currently set value of the language option corresponds to Korean/English. In addition, if the user creates an interaction for altering a notification mode option (e.g., ringing mode to silent mode or vice versa, etc.) in a specific mode, the controller 400 identifies whether the currently set value of the notification mode option corresponds to the ringing/silent mode.

After that, the controller 400 toggles the second option according to the identified value of the second option in step 623. For example, if the network option has been set to an ON state, the controller 400 toggles the network state from the ON state to an OFF state. Likewise, if the network option has been set to an OFF state, the controller 400 toggles the network state from the OFF state to the ON state. After completing the toggling operation, the controller 400 outputs an information showing pop-up window according to a user's settings in step 625. For example, if a user's setting has been set in such a way that the information showing pop-up window is output when the option setting alteration is completed, the controller 400 displays the information showing pop-up window, showing the altered option setting value (e.g., a network option for providing a Wi-Fi service has been set to be turned on/off) on the execution screen. The information showing pop-up window may be selectively provided so that the user can intuitively check the altered second option. This embodiment may be implemented in such a way that it doesn't include a step of outputting the guide message showing pop-up window for informing the option setting alteration.

When the setting/altering operation of the second option has been completed via the processes described above, the controller 400 controls the user device to return to the state showing the previous execution screen at step 617. For example, if the controller 400 detects an interaction that has completed the setting of the second option or a user's final confirmation via the pop-up window, it terminates the option setting mode and controls the display unit to display the execution screen in the same specific mode as step 601. The controller 400 may automatically remove the information showing pop-up window for informing that the second option has been altered after a certain period of time has elapsed, and display the execution screen.

If the second option is altered in the same mode as the first option, the controller 400 can alter the setting of the second option via steps 609 to 615.

As described above, the system and method for setting options of a user device, according to the present invention, allows a user to intuitively and simply alter the setting of options of an application that is being executed in a user device. The system and method can alter one or more options according to applications in a user device, and store and manage them. Since the system and method allows a user to alter options of respective applications in a user device according to his/her preferences, not the developers of the applications, he/she can comfortably use the device and the applications. For example, the user can decrease the level of brightness for an e-book viewer on the screen of a user device to be less than that when the other applications are executed.

In addition, the system and method for setting options of a user device, according to the present invention, allows a user to easily set options of an application while it is being executed in a user device. Since the system and method allows the device user to easily alter the options without the execution of an application, it can provide convenience to the user. For example, if a user alters letters (e.g., color, size, font, etc) for email according to his/her preference, he/she can read it with more comfort.

In addition, the system and method for setting options of a user device, according to the present invention, prevents the resources of the user device from being wasted according to the operation for setting options while an application is being executed. For example, if a user needs to reduce the level of brightness or turn off a network (e.g., Wi-Fi) in the user device while an application is being executed, the user device can simply and rapidly alter the corresponding resources according to the user's request, without stopping the execution of the application, and thus prevents additional power consumption and additional space of the memory from being wasted.

In addition, the system and method according to the present invention can set options in a mobile device, via the sensor module installed to the device, and thus doesn't require an additional cost to set the options. That is, the user device can set/alter the options while applications are being executed, via a number of sensors installed thereto.

In addition, the system and method for setting options of a user device, according to the present invention, can set, store and manage options according to respective applications. For example, if an application has been set so that the options are altered and then is re-executed later, it is executed based on the last set options. That is, the system and method according to the present invention can execute applications in a user device, based on options that are differently set according to the respective applications, and thus operate the user device with the optimal options for the respective applications. The system and method allows a user to alter a variety of options according to applications in a user device, simply and in real time.

In addition, the system and method for setting options of a user device, according to the present invention, can implement an environment so that the user can optimally alter options of the user device, thereby enhancing user convenience and competitiveness of the user device. The system and method according to the present invention can be applied to all types of user devices and equivalent devices.

As described above, the method for setting options in a user device according to the present invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the present invention or may be software well-known to the ordinary person skilled in the art.

The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as floptical disk, ROM, RAM, flash memory, etc. The program commands include assembly language or machine code compiled by a complier and a higher level language interpreted by an interpreter. The hardware systems may be implemented with at least one software module to comply with the present invention.

Although certain embodiments of the present invention have been described in detail hereinabove, it should be understood that many variations and modifications will be apparent to those skilled in the art, and will still fall within the spirit and scope of the embodiments of the present invention as defined in the appended claims.

What is claimed is:

1. A method for setting a value of options of an operational environment in a user device comprising:
   executing an option setting mode of a running application in response to detecting an interaction via a sensor module while the application is running;
   altering an option setting value of an option of the running application in response to detecting another interaction in the option setting mode of running the application, and displaying the altered option setting value; and
   storing the option of the running application with the altered option setting value,
   wherein the altered option setting value of the application is applied while the application is running,
   wherein the option setting value of the application is released after a user's operation to block the sensor module is maintained or a user initially blocks the sensor module only once, and
   wherein altering the option setting value of the option of the running application comprises:
   identifying a sensor that detected the other interaction, determining whether the other interaction detected via the sensor is an interaction for option setting,
   identifying, if the other interaction is an interaction for the option setting, an option mapped to the interaction and the sensor in the running application, and
   altering the option setting value of the option of the running application according to the other interaction, and
   wherein storing the option of the running application comprises mapping a number of options to the running application and the storing option setting values of the respective options.

2. The method of claim 1, wherein executing the option setting mode of an application comprises:
   detecting a first interaction via a first sensor of the sensor module;
   executing an option setting mode according to the first interaction;
   detecting a second interaction via a second sensor of the sensor module in the option setting mode; and
   altering an option setting value of the option according to the second interaction.

3. The method of claim 2, wherein displaying the altered option setting value comprises:
   displaying a guide message showing pop-up window when the option setting mode is executed according to the first interaction.

4. The method of claim 3, further comprising:
   altering the option according to the second interaction detected via the second sensor and displaying the altered result via the guide message showing pop-up window.

5. The method of claim 1, wherein executing the option setting mode of an application comprises:
   detecting a first or second interaction via a specific sensor of the sensor module;
   altering, if the first interaction is detected, an option setting value of a first option according to the first interaction; and
   altering, if the second interaction is detected, an option setting value of a second option according to the second interaction.

6. The method of claim 1, wherein executing the option setting mode of an application comprises:
   detecting a first or third interaction via a first sensor of the sensor module;
   determining, if the first interaction is detected, an option setting value of a first option as a value to be altered, and altering the option setting value of the first option according to a second interaction input to a second sensor; and
   determining, if the third interaction is detected, an option setting value of a second option as a value to be altered, and altering the option setting value of the second option according to a fourth interaction input to the second sensor.

7. The method of claim 1, further comprising:
   determining, when an application is executed, whether there are option setting values set for the application;
   executing, if there are option setting values set for the application, the application with the option setting values; and
   executing, if there are not any option setting values set for the application, the application with default option setting values set in the user device.

8. The method of claim 1, wherein displaying the altered option setting value comprises:

determining an option setting value of the option according to a state of the user device changed by creating the interaction; and altering the option according to the determined option setting value, and outputting the altered option.

9. A user device comprising:
a sensor for detecting a change in state of the user device, wherein the sensor comprises one or more sensors;
a storage for storing one or more options according to respective applications of the user device and one or more option setting values according to each of the applications;
a display for displaying a guide message showing pop-up window for showing a message for setting an option in an application; and
a controller for:
executing an option setting mode of a running application in response to detecting an interaction via the sensor module while the application is running,
managing option setting values of one or more options for each of the applications,
altering, the option setting values of an option of the running application, in response to detecting another interaction in the option setting mode of the running application to the interaction, and
operating the option of the application with the altered option setting values,
wherein the altered option setting value of the application is applied while the application is executed,
wherein the option setting value of the application is released after a user's operation to block the sensor module is maintained or a user initially blocks the sensor module only once, and
wherein altering the option setting value of the option of the running application comprises:
identifying a sensor that detected the other interaction,
determining whether the other interaction detected via the sensor is an interaction for option setting,
identifying, if the other interaction is the interaction for the option setting, an option mapped to the other interaction and the sensor in the running application, and
altering the option setting value of the option of the running application according to the other interaction, and
wherein storing the one or more options according to respective applications comprises mapping a number of options to the running application and storing option setting values of the respective options.

10. The user device of claim 9, wherein the controller executes an option setting mode if a first interaction is detected via a first sensor of the sensor; and
alters, if a second interaction is detected via a second sensor of the sensor in the option setting mode, the option setting values according to the second interaction.

11. The user device of claim 9, wherein the controller detects interactions that are different in type from each other via specific sensors of the sensor, and alters a setting value of a first or second option according to the detected type of interaction.

12. The user device of claim 9, wherein the controller: executes, when detecting a first interaction via a first sensor of the sensor, an option setting mode of a first option, and alters an option setting value of the first option according to a second interaction of a second sensor of the sensor in the option setting mode of the first option; and
executes, when detecting a third interaction via the first sensor of the sensor, an option setting mode of a second option, and alters an option setting value of the second option according to a fourth interaction of the second sensor of the sensor in the option setting mode of the second option.

13. A method for setting a value of options of an operational environment in a user device comprising:
executing an option setting mode of a running application in response to detecting an interaction via a sensor module while the application is running;
altering an option setting value of an option of the running application in response to detecting another interaction in the option setting mode of running the application, and displaying the altered option setting value; and
storing the option of the running application with the altered option setting value,
wherein the altered option setting value of the application is applied while the application is running,
wherein the option setting value of the application is released after a user's operation to block the sensor module is maintained or a user initially blocks the sensor module only once, and
wherein altering the option setting value of the option of the running application comprises:
identifying a sensor that detected the other interaction,
determining whether the other interaction detected via the sensor is an interaction for option setting,
identifying, if the other interaction is an interaction for the option setting, an option mapped to the other interaction and the sensor in the running application, and
altering the option setting value of the option of the running application according to the other interaction, and
wherein storing the option of the running application comprises mapping a number of options to the running application and the storing option setting values of the respective options.

* * * * *